US011388899B2

(12) United States Patent
Long et al.

(10) Patent No.: US 11,388,899 B2
(45) Date of Patent: Jul. 19, 2022

(54) AUTOMATED LOADING FOR AN AGRICULTURAL MACHINE

(71) Applicant: CNH Industrial America LLC, New Holland, PA (US)

(72) Inventors: Scott Long, Plainfield, IL (US); Nathan Brooks, Manitowoc, WI (US); Monte Weller, Frankfort, IL (US); Lyle Mangen, Willmar, MN (US); Michael Armstrong, Oak Creek, WI (US)

(73) Assignee: CNH Industrial America LLC, New Holland, PA (US)

( * ) Notice: Subject to any disclaimer, the term of this patent is extended or adjusted under 35 U.S.C. 154(b) by 247 days.

(21) Appl. No.: 16/574,509

(22) Filed: Sep. 18, 2019

(65) Prior Publication Data

US 2021/0078025 A1 Mar. 18, 2021

(51) Int. Cl.
| | | |
|---|---|---|
| *A01M 7/00* | (2006.01) | |
| *B05B 9/06* | (2006.01) | |
| *A01B 71/02* | (2006.01) | |
| *F04B 49/06* | (2006.01) | |
| *A01C 23/00* | (2006.01) | |

(Continued)

(52) U.S. Cl.
CPC .......... *A01M 7/0089* (2013.01); *A01B 71/02* (2013.01); *A01C 23/007* (2013.01);
(Continued)

(58) Field of Classification Search
CPC ... A01M 7/0089; A01M 7/0085; A01B 71/02; A01C 23/007; A01C 23/008; B05B 9/06;
(Continued)

(56) References Cited

U.S. PATENT DOCUMENTS

| 3,876,234 A | 4/1975 | Harms |
| 7,850,190 B2 | 12/2010 | Ruckle et al. |

(Continued)

FOREIGN PATENT DOCUMENTS

WO 2013056908 4/2013

OTHER PUBLICATIONS

Matt Hopkins; "John Deere's Load Command: A Quick Fill"; article; Sep. 24, 2009; 5 pages https://www.croplife.com/iron/sprayers/john-deeres-load-command-a-quick-fiil/.

(Continued)

*Primary Examiner* — Nicolas A Arnett
(74) *Attorney, Agent, or Firm* — Rebecca L. Henkel; Rickard K. DeMille (57) ABSTRACT

An intelligent, automated system for loading agricultural product application equipment is provided in which a control system can determine a necessary amount of product for completing a field operation and can automatically couple with a tendering system to receive such product at an optimal time and location. The control system can determine a current amount of product, a projected amount of product necessary to complete a field operation and a refill amount of product from the current amount and the projected amount, then transmit the refill amount to the tender. The control system can further determine whether a position of the equipment relative to the tender is within a threshold, and whether an intake coupler of the equipment is connected to a supply coupler of the tender, and can control valve(s) to open and close channel(s) for loading fluid into the storage tank.

18 Claims, 6 Drawing Sheets

(51) Int. Cl.
    *B67D 7/32*     (2010.01)
    *B67D 7/34*     (2010.01)
    *B67D 7/02*     (2010.01)
    *B67D 7/04*     (2010.01)
    *F04B 23/02*     (2006.01)

(52) U.S. Cl.
CPC ......... *A01C 23/008* (2013.01); *A01M 7/0085* (2013.01); *B05B 9/06* (2013.01); *B67D 7/02* (2013.01); *B67D 7/32* (2013.01); *B67D 7/344* (2013.01); *F04B 49/065* (2013.01); *B67D 2007/0403* (2013.01); *B67D 2007/0421* (2013.01); *B67D 2007/0463* (2013.01); *B67D 2007/0465* (2013.01); *F04B 23/02* (2013.01)

(58) Field of Classification Search
CPC . B67D 7/02; B67D 7/32; B67D 7/344; B67D 2007/0403; B67D 2007/0421; B67D 2007/0463; B67D 2007/0465; B67D 2007/0457; F04B 49/065; F04B 23/02; F04B 17/05; F04B 17/06
See application file for complete search history.

(56) References Cited

U.S. PATENT DOCUMENTS

| | | | |
|---|---|---|---|
| 7,857,237 B2 | 12/2010 | Vickers et al. | |
| 8,186,393 B2 | 5/2012 | Huegerich et al. | |
| 8,191,798 B2 | 6/2012 | Hahn et al. | |
| 8,344,897 B2* | 1/2013 | Peterson | A01B 69/008 340/612 |
| 8,360,343 B2* | 1/2013 | Gudat | E21F 5/02 239/172 |
| 8,430,139 B2 | 4/2013 | Pell et al. | |
| 8,800,887 B2 | 8/2014 | Moeller et al. | |
| 9,296,604 B2* | 3/2016 | Ballu | A01M 7/0085 |
| 9,386,738 B2 | 7/2016 | Peterson | |
| 9,554,506 B2 | 1/2017 | Bittner et al. | |
| 9,823,665 B2* | 11/2017 | Finnell | B67D 7/342 |
| 9,877,470 B2* | 1/2018 | Crinklaw | B05B 12/122 |
| 10,111,373 B2 | 10/2018 | Blackwell et al. | |
| 10,149,422 B2 | 12/2018 | Tippery et al. | |
| 11,155,456 B2* | 10/2021 | Long | A01C 23/008 |
| 2010/0018608 A1 | 1/2010 | Huegerich et al. | |
| 2017/0049093 A1 | 2/2017 | Belden | |
| 2018/0042215 A1* | 2/2018 | Proharam | A01C 23/042 |
| 2019/0021218 A1 | 1/2019 | Sheppard et al. | |
| 2019/0022687 A1 | 1/2019 | Brooks et al. | |
| 2019/0090472 A1 | 3/2019 | Crinklaw et al. | |

OTHER PUBLICATIONS

"QuickDraw Spray Tender System"; website first available Dec. 27, 2014; http://www.surefireag.com/product/quickdraw.

* cited by examiner

AUTOMATED LOADING FOR AN AGRICULTURAL MACHINE

FIELD OF THE INVENTION

The invention relates generally to agricultural product application equipment such as self-propelled sprayers and, in particular, to an automated loading system for such equipment comprising an interlock system in fluid communication with a storage tank, a sensing system and a control system in which the control system determines whether a position of the agricultural machine relative to a tender is within a threshold, determines whether an intake coupler of the interlock system is connected to a supply coupler of the tender, and controls a valve(s) to open and close channel(s) for loading fluid into the storage tank.

BACKGROUND OF THE INVENTION

Over time, agricultural sprayers have gotten larger to increase machine efficiency with wider booms that can cover more area in a single pass. The operational systems of sprayers have correspondingly gotten more powerful and complex. Such complex operational systems include product delivery systems that direct stored product to multiple spray sections of the boom and can include rinse and air systems for liquid and pneumatic purging of various lines of the sprayer. Filling or tendering a sprayer typically requires at least two people and sometimes more. The operator typically must exit the cab of the sprayer in order to connect a storage tank input of the sprayer to a filling line of the tender. This requires effort on the part of the operator and exposure to the fluid being transferred to the sprayer. A need therefore exists to provide a system for tendering a sprayer that eliminates one or more of the foregoing disadvantages.

SUMMARY OF THE INVENTION

An intelligent, automated system for loading agricultural product application equipment is provided in which a control system can determine a necessary amount of product for completing a field operation and can automatically couple with a tendering system to receive such product at an optimal time and location. The control system can determine a current amount of product, a projected amount of product necessary to complete a field operation and a refill amount of product from the current amount and the projected amount, then transmit the refill amount to the tender. The control system can further determine whether a position of the equipment relative to the tender is within a threshold, and whether an intake coupler of the equipment is connected to a supply coupler of the tender, and can control valve(s) to open and close channel(s) for loading fluid into the storage tank.

In one aspect, a communication link between a tender truck and sprayers can allow for faster fill times, more accurate fill calculations, less waste, and require less resources. This can be accomplished by optimizing the time to refill with a smart tender system that works in close conjunction with the sprayer. When applying chemical, precision farming controls can determine how much product has been applied, how much product is in the tank, and how much area is left to spray. This information can be transmitted remotely to smart tender system. This can allow a batch to be mixed before the operator arrives. Additionally, by knowing how much is left in the tank and the area left to apply, the smart tender system can only mix the exact amount needed to finish a field. In an additional aspect, the best time to fill can also be calculated. In long fields, there may not be enough in the tank at any given moment to cross the field and return. This system can alert an operator as to when the best time to fill is with respect to time management.

In one aspect, an electronic/mechanical mechanism to attach, fill, and detach a tender cart to a sprayer, without the operator leaving the cabin of the sprayer, is provided. As discussed above, the smart tender system could determine an exact, correct amount of product ready to load. Using sensors and higher capacity plumbing, the tender can automatically couple to the sprayer. After automatically coupling, the tender can send signals to the sprayer remotely to open plumbing valves in the proper sequence for filling. Using enhance plumbing and using an on-board controller, the tender can rapidly push the product onto the sprayer, such as in under 2 minutes. After the load is pushed onto the sprayer, the tender can automatically decouple, and the sprayer can return to regular application.

Specifically then, one aspect of the present invention provides an automated loading system for an agricultural machine, including: an interlock system in fluid communication with a storage tank, the interlock system including: a channel for loading fluid into the storage tank; an intake coupler connected to the channel; and an electronically controlled valve for opening and closing the channel; a sensing system including: a first sensor configured to sense a position of the agricultural machine relative to a tender for loading the storage tank; and a second sensor configured to sense a position of the intake coupler relative to a supply coupler of the tender; and a control system in communication with the interlock system and the sensing system, the control system executing a program stored in a non-transient medium operable to: receive a command from a user to initiate loading of the storage tank; after receiving the command, use the first sensor to determine whether a position of the agricultural machine relative to a tender is within a threshold; after determining the position of the agricultural machine relative to a tender to be within the threshold, use the second sensor to determine whether the intake coupler is connected to the supply coupler; and after determining the intake coupler to be connected to the supply coupler, control the electronically controlled valve to open the channel for loading fluid into the storage tank.

Another aspect of the present invention provides a method for automated loading an agricultural machine, including: configuring an interlock system to a storage tank, the interlock system including: a channel for loading fluid into the storage tank; an intake coupler connected to the channel; and an electronically controlled valve for opening and closing the channel; configuring a first sensor to sense a position of the agricultural machine relative to a tender for loading the storage tank; configuring a second sensor to sense a position of the intake coupler relative to a supply coupler of the tender; receiving a command from a user to initiate loading of the storage tank; after receiving the command, using the first sensor to determine whether a position of the agricultural machine relative to a tender is within a threshold; after determining the position of the agricultural machine relative to a tender to be within the threshold, using the second sensor to determine whether the intake coupler is connected to the supply coupler; and after determining the intake coupler to be connected to the supply coupler, controlling the electronically controlled valve to open the channel for loading fluid into the storage tank.

Another aspect of the present invention provides an automated loading system for an agricultural machine, including: a storage tank for holding agricultural product; a wireless communications system; and a control system in communication with the wireless communications system, the control system executing a program stored in a non-transient medium operable to: deter mine a current amount of agricultural product in the storage tank; determine a projected amount of agricultural product necessary to complete an agricultural field operation; determine a refill amount of agricultural product from the current amount and the projected amount; and use the wireless communications system to communicate the refill amount to a tender configured to supply the agricultural product.

Another aspect of the present invention provides a method for automated loading an agricultural machine, including: determining a current amount of agricultural product in a storage tank; determining a projected amount of agricultural product necessary to complete an agricultural field operation; determining a refill amount of agricultural product from the current amount and the projected amount; and using a wireless communications system to communicate the refill amount to a tender configured to supply the agricultural product.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
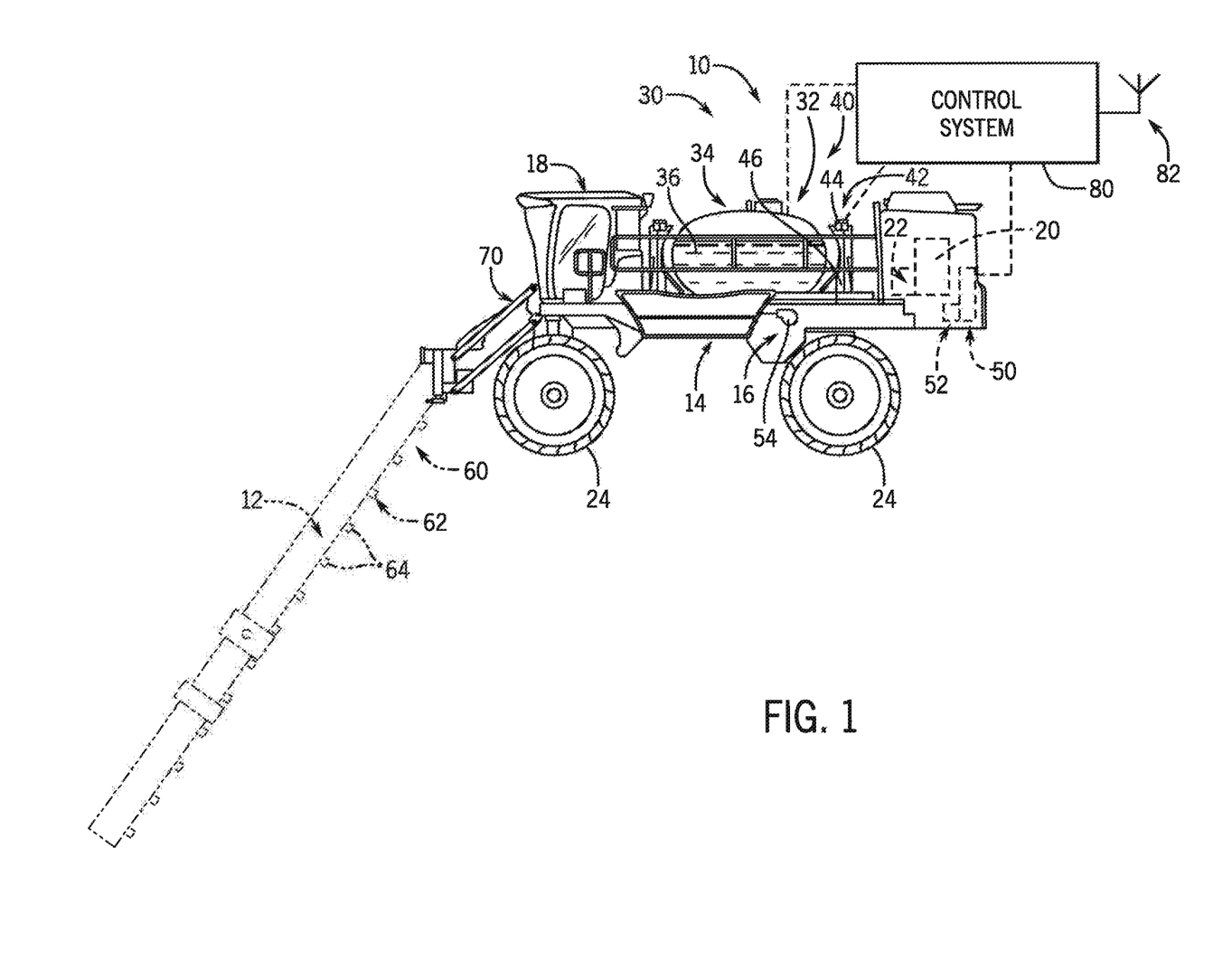
FIG. 1 is a side elevation of an agricultural machine implementing a loading system according to the present invention.

Referring now to the drawings and specifically to FIG. 1, an agricultural machine 10, shown here as an agricultural sprayer, or more specifically a self-propelled agricultural sprayer vehicle, can be configured in accordance with an aspect of the invention. For agricultural field operations, the machine 10 can include a foldable spray boom 12. Although the spray boom 12 is shown as a front-mounted boom, it is understood that the machine 10 can have either front-mounted or rear-mounted booms, such as those available from CNH Industrial, including the Miller Nitro and Condor Series sprayers and New Holland Guardian Series sprayers.

The machine 10 can also include a chassis 14 having chassis frame 16 that supports various assemblies, systems, and components. These various assemblies, systems, and components include cab 18, engine 20, and hydraulic system 22. The hydraulic system 22 receives power from engine 20 and includes at least one hydraulic pump which may be in a hydrostat arrangement for providing hydraulic pressure for operating hydraulic components within the hydraulic system 22. For sprayers with hydrostatic drives, hydraulic motors are operably connected to the hydraulic pump(s) for rotating wheels 24. In mechanical drive applications, a mechanical transmission receives power from engine 20 and delivers power for rotating wheels 24 by way of power-transmitting driveline components such as drive shafts, differentials, and other gear sets in portal, drop boxes, or other housings.

The machine 10 can also include a product system 30 which includes a product storage system 32 with product tank 34 storing an agricultural liquid product 36 on the machine 10 on a chassis of the machine 10. Product 36 includes any of a variety of agricultural liquid products, such as various pesticides, herbicides, fungicides, liquid fertilizers, and other liquids including liquid suspensions beneficial for application onto agricultural fields by way of spray boom 12. Rinse system 40 includes a rinse liquid storage system 42 having rinse tank 44 storing a rinse liquid 46 such as water or another suitable rinse liquid. The Rinse system 40 allows rinsing the spray boom 12 to remove the product 36 therefrom. A fuel tank 50 can provide diesel fuel for powering the engine 20. Also, a Diesel Exhaust Fluid (DEF) tank 52 can provide DEF for treatment of exhaust emissions A pump 54 can push either liquid product 36 or rinse liquid 46 through plumbing components such as interconnected pieces of tubing and through a boom flow system 60 that includes segments of boom tubing 62 for release out of spray nozzles 64 that are spaced from each another along the width of boom 12 during spraying or rinsing operations. Accordingly, such plumbing components can connect the product storage system 32, the rinse liquid storage system 42 and the boom 12 via an on-board valve system and boom valve system. Groups or banks of multiple adjacent spray nozzles 64 define multiple spray sections. During spraying procedures, spray sections defined along boom 12 selectively deliver product 36 for release onto an agricultural field at locations corresponding to positions of activated spray sections. Boom 12 is connected to chassis 14 with lift arm assembly 70 that is configured to move the boom 12 up and down for adjusting the height of application of the product 36.

A control system 80 can implement an intelligent, automated system for loading various fluids of the machine 10 as discussed herein. In one aspect, the control system 80 can automatically couple with a tendering system to receive such product. The control system 80 can determine whether a position of the machine 10 relative to the tender is within a threshold, and whether an intake coupler of the machine 10 is connected to a supply coupler of the tender, and can control valve(s) to open and close channel(s) for loading such fluid. The control system 80 can comprise a processor executing a program stored in non-transient medium operable to communicate with various other systems of the machine 10, including a wireless communications system 82, as well as an interlock system and a sensing system as discussed in greater detail herein.

Figure 2:
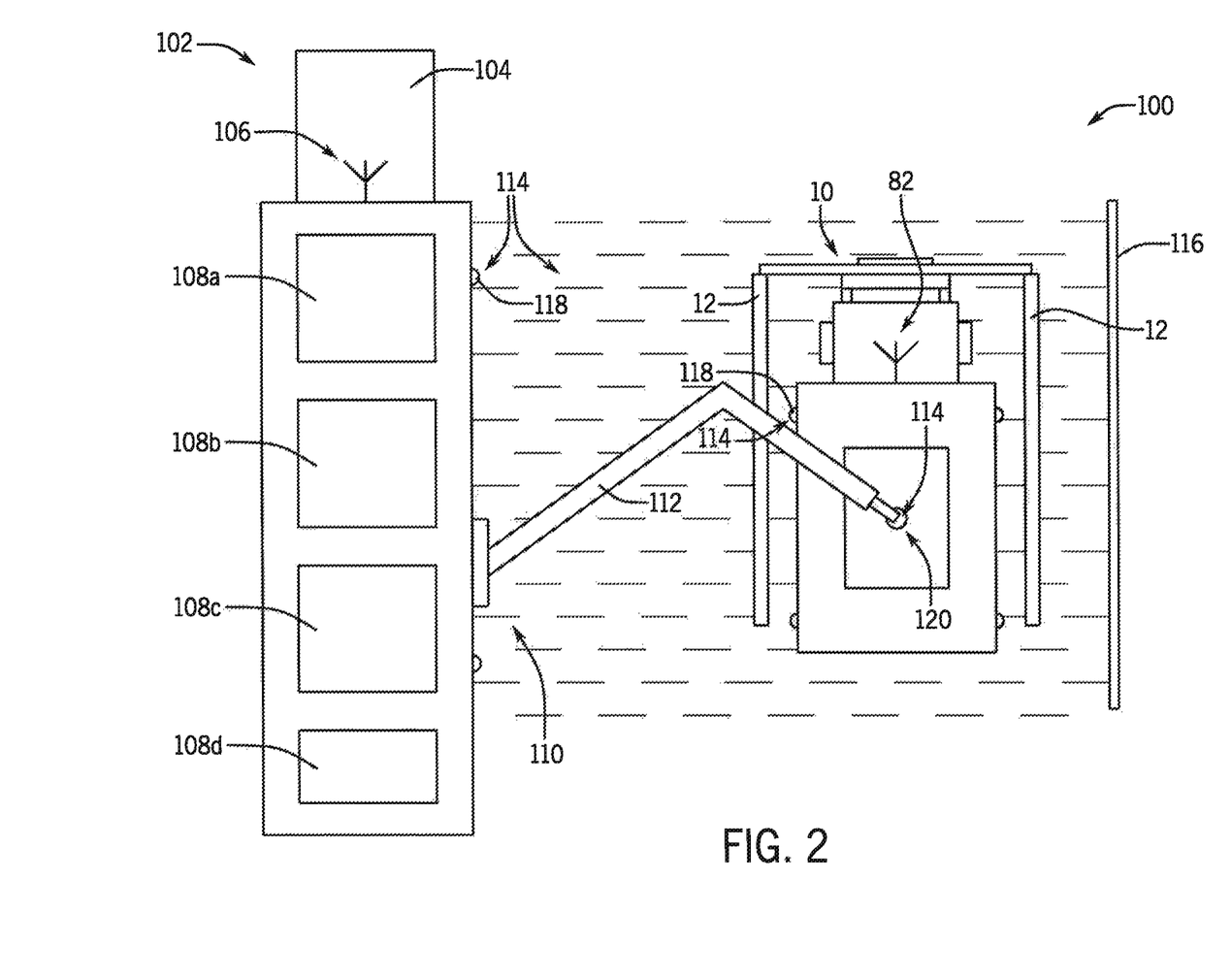
FIG. 2 is a plan view of automated loading between a sprayer and a tender according to the present invention.

Referring now to FIG. 2, in an exemplar loading system 100, various storage tanks of the machine 10, such as the product tank 34, rinse tank 44, fuel tank 50 and/or DEF tank 52, can be refilled with corresponding fluids by a tender system 102. The tender system 102 could comprise a tender 104 or similar truck having a wireless communications system 106 in communication with the machine 10, such as through a cellular network. The tender 104 can include multiple storage containers 108 holding various fluids in separate containers for refilling the machine 10, such as the product container 108a, rinse container 108b, fuel container 108c and/or DEF container 108d, as well as a refill system 110 comprising an articulating arm 112, pump, valves and fluid conduits for automatically refilling the machine 10 with a selected fluid from a container 108.

The loading system 100 can include multiple sensors in a sensing system 114 monitored by the control system 80. The sensing system 114 can include one or more sensors configured to sense a position of the machine 10 relative to the tender 104 for correct alignment in a loading zone. In one aspect, such sensors can comprise a light curtain 116 defining the zone for the machine 10 to align to continue the loading operation. In another aspect, such sensors can comprise one or more proximity sensors 118, such as electromagnetic and/or ultrasonic proximity sensor, located on the machine 10 and/or the tender 104, defining the zone for the machine 10 to align. In another aspect, such sensors can comprise one or more location sensors, such as a Global Positioning System (GPS) located on the machine 10 and/or the tender 104, defining the zone for the machine 10 to align. The sensing system 114 also include one or more sensors configured to sense engagement and disengagement for the filling or tendering operation as discussed in more detail with respect to FIG. 3.

The refill system 110 can engage an interlock system 120 in fluid communication with the storage tank of the machine 10. With additional reference to FIG. 3, in one aspect, the interlock system 120 can comprise first and second portions 122a and 122b, respectively, configured for selective engagement and disengagement. One of the first and second portions 122a and 122b, respectively, can be associated with the machine 10, such as the first portion 122a, and the other of the first and second portions 122a and 122b, respectively, can be associated with the articulating arm 112 of the tender 104, such as the second portion 122b. The first and second portions 122a and 122b, respectively, can be configured for electronically actuated rotary engagement in which a relative rotary motion between the two portions ensures that tapered sealing surfaces 124a, 124b are forced together into intimate frictional contact providing a fluid-tight connection and in which relative longitudinal motion between the two first and second portions 122a and 122b, respectively, tending to disengage the sealing surfaces is precluded. A rotary cam mechanism of the portions providing such engagement can comprise, for example, spiral cam tracks 126 disposed in a double helix associated with a mouth of a female portion of the first portion 122a, and cam follower lugs 128 disposed at a base of a male portion of the second portion 122b comprising cylindrical surfaces.

Figure 3:
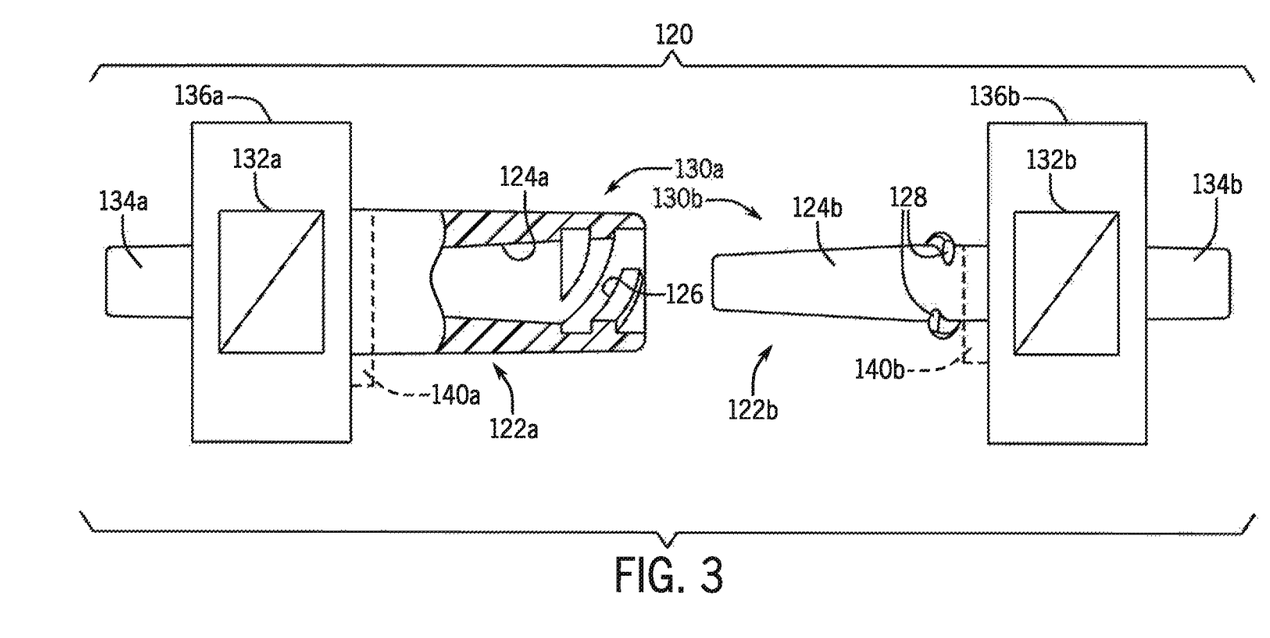
FIG. 3 is a partial cutaway view of interlock system for coupling between a sprayer and a tender according to the present invention.

Accordingly, still referring to FIG. 3, each of the first and second portions 122a and 122b, respectively, can include a coupler 130, an electronically controlled valve 132, and a channel 134. The electronically controlled valve 132 can be controlled by the control system 80 for opening and closing the channel 134. Either or each of the first and second portions 122a and 122b, respectively, can also include an electronically controlled motor 136. The electronically controlled motor 136 can be controlled by the control system 80 for actuating a respective coupler 130, in clockwise and counterclockwise rotations, to selectively provide the aforementioned engagement and disengagement.

In an example in which the first portion 122a is associated with the machine 10, the first portion 122a comprises an intake coupler 130a connected to a channel 134a for loading fluid into a storage tank of the machine 10. Similarly, in an example in which the second portion 122b is associated with the articulating arm 112, the second portion 122b comprises a supply coupler 130b connected to a channel 134b for supplying fluid from a container 108 of the tender 104.

Either or each of the first and second portions 122a and 122b, respectively, can also include one or more sensors 140 configured to sense engagement and disengagement for the filling or tendering operation as part of the sensing system 114 monitored by the control system 80. The one or more sensors 140 can be configured to sense a position of one of the couplers 130a, 130b relative to another of the couplers 130a, 130b. The sensors 140 could comprise magnetic proximity sensors and/or pressure induced proximity sensors.

Figure 4:
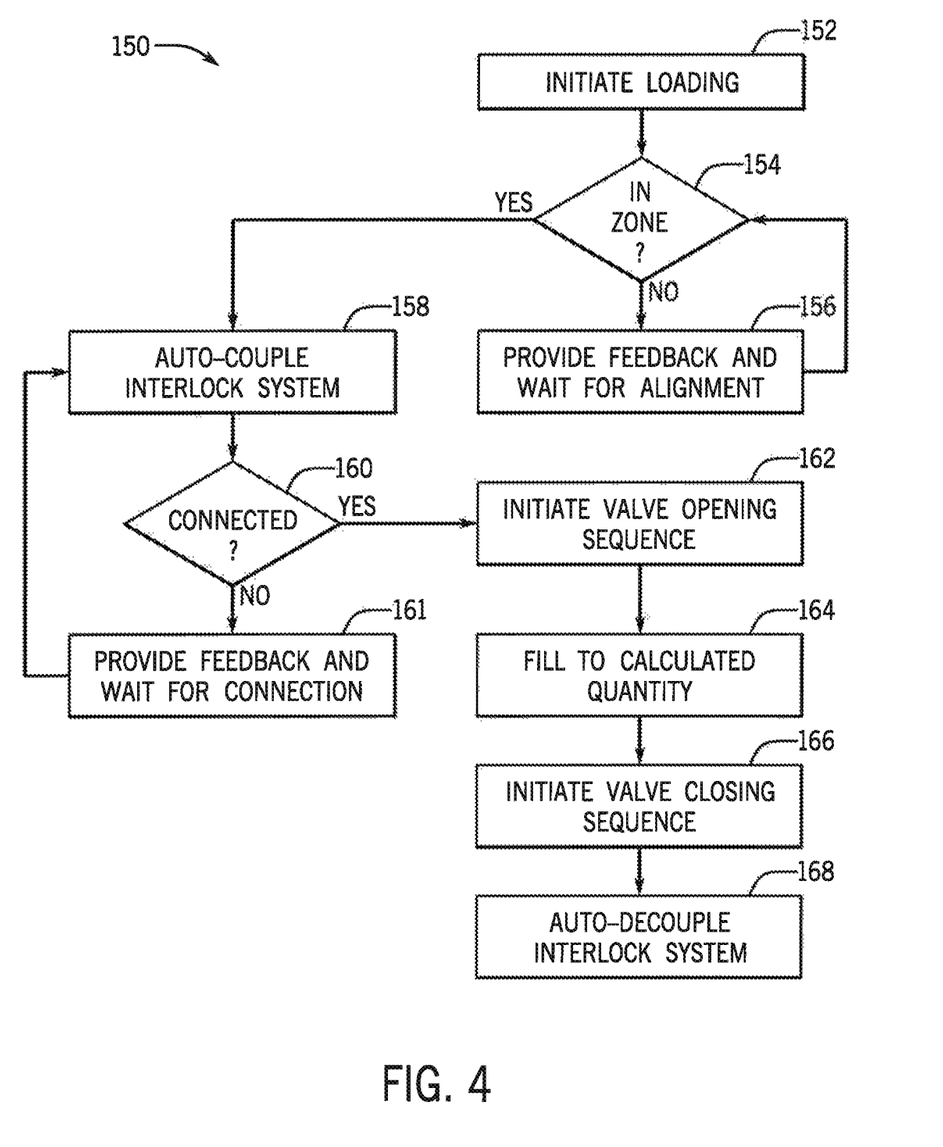
FIG. 4 is a process for automatically coupling a sprayer to a tender for automated loading according to the present invention.

Referring now to FIG. 4, a process 150 for the automated loading operation is provided in accordance with an aspect of the invention. The process 150 could be executed, for example, by the control system 80. Beginning at step 152, the system can receive a command from a user of the machine 10 to initiate loading of a storage tank, such as the product tank 34. The command could be submitted by the user through a Human Machine Interface (HMI) arranged in the cab 18. Upon receipt of the command, the machine 10 can establish a wireless communications link to execute wireless communications with the tender system 102 for coordinating the loading operation.

Next, at decision step 154, the system can determine whether a position of the machine 10 relative to the tender 104 is within a threshold. The system can monitor sensors of the sensing system 114, such as the light curtain 116 and/or proximity sensors 118, to ensure a correct alignment of the machine 10 in a zone defined by the tender 104. If the machine 10 is outside of the zone ("No"), and therefore exceeds the threshold, the process can proceed to step 156 to provide such feedback to the user via the HMI, such as a light or sound, to assist in correction, and return to decision step 154, in a continuous loop, until correct alignment in the zone within the threshold is achieved, or a timeout or cancellation occurs.

Next, after determining the position of the machine 10 to be within the threshold ("Yes"), the process can proceed to step 158 to automatically engage the interlock system 120 between the machine 10 and the tender 104. In particular, the articulating arm 112 can automatically extend and position the supply coupler of the tender 104, such as the supply coupler 130b, relative to the intake coupler of the machine 10, such as the intake coupler 130a. The control system 80 can actuate the couplers to engage, via one or more of the electronically controlled motors 136, and at decision step 160, the system can monitor sensors of the sensing system 114, such as the sensors 140, to determine whether the intake coupler is connected to the supply coupler and a fluid-tight connection is achieved. If the system does not sense that a fluid-tight connection is achieved ("No"), the process 150 can proceed to step 161 to provide such feedback to the user via the HMI, such as a light or sound, and return to decision step 160, in a continuous loop, until correct alignment in the zone within the threshold is achieved, or a timeout or cancellation occurs.

Next, after determining a fluid-tight connection is achieved with the intake coupler connected to the supply coupler ("Yes"), the process can proceed to step 162 to automatically initiate a valve opening sequence. The valve opening sequence can comprise opening valves on the machine 10, such as the electronically controlled valve 132a of the intake coupler 130a, and opening valves on the tender 104, such as the electronically controlled valve 132b of the supply coupler 130b and/or valves associated with a container 108, pump, fluid conduits and the like, to safely and securely begin supply of the desired fluid to a storage tank of the machine 10. For example, the system can control the valve 132a of the intake coupler 130a to open first, then control the valve 132b of the supply coupler 130b to next. Such sequencing can be programmable.

Next, the process can proceed to step 164 in which a predetermined quantity of the desired fluid, calculated by the control system 80, is automatically provided to the machine 10. The predetermined quantity can advantageously be significantly less than a maximum size of the storage tank of the machine 10, such that the storage tank of the machine 10 can be significantly less than full when filling is completely. This can be particularly useful when filling product 36 into the product tank 34 to allow less waste by providing only the amount of product necessary to complete the agricultural field operation plus a nominal guard band amount.

Next, after filling the storage tank with the predetermined quantity of fluid, the process can proceed to step 166 to automatically initiate a valve closing sequence. The valve closing sequence can comprise closing valves on the machine 10 and the tender 104 in a reverse order from which such valves were opened to safely and securely end supply of the desired fluid. For example, the system can control the valve 132b of the supply coupler 130b to close first, then control the valve 132a of the intake coupler 130a to close next. Such sequencing can be programmable.

Finally, the process can proceed to step 168 to automatically disengage the interlock system 120 between the machine 10 and the tender 104. In particular, the control system 80 can actuate the couplers to disengage, via the one or more electronically controlled motors 136, and the articulating arm 112 can automatically retract away from the machine 10. The system can monitor sensors of the sensing system 114, such as the sensors 140, to determine whether the intake coupler is disconnected from the supply coupler, and whether the articulating arm 112 is safely away from the machine 10, with feedback to the user, such that the machine 10 can then exit the zone.

In another aspect, the control system 80 can determine a necessary amount of fluid, such as product 36, for completing a field operation, and can automatically couple with a tendering system to receive such product at an optimal time and location. The control system 80 can determine a current amount of fluid, such as product 36, a projected amount of fluid necessary to complete a field operation and a refill amount of fluid from the current amount and the projected amount, then transmit the refill amount to the tender.

Figure 5:
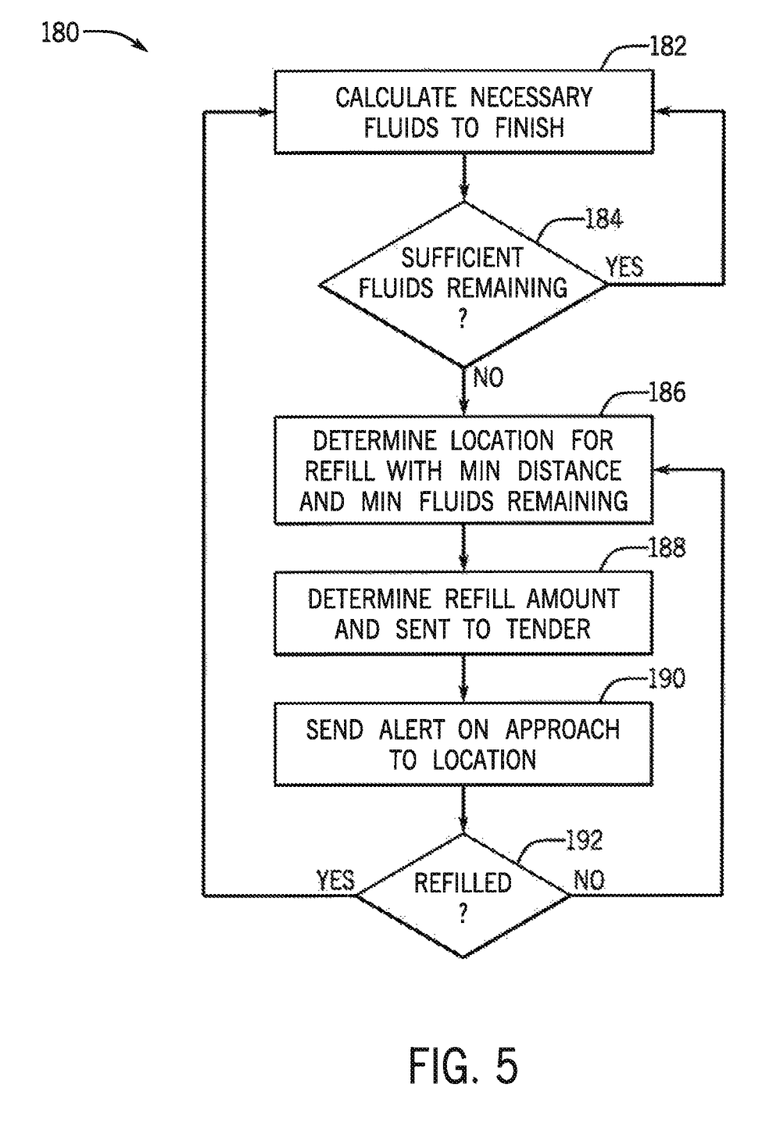
FIG. 5 is a process for determining a refill path and amount for automated loading according to the present invention.

Referring now to FIG. 5, a process 180 for the automated loading operation is provided in accordance with an aspect of the invention. The process 180 could be executed, for example, by the control system 80. Beginning at step 182, the system can determine necessary or projected amounts of fluids, such as product 36, to complete an agricultural field operation. The system can determine the projected amounts, for example, by monitoring progress of the agricultural field operation, including product application rate and speed of the machine 10, relative to a prescription map.

Next, at decision step 184, the system can determine whether sufficient fluids are available in storage tanks of the machine 10 to complete the field operation. If sufficient fluids are available ("Yes"), the process can return to step 182 to check for variable changes, such as an increase in application rate or speed, in a continuous loop.

However, if sufficient fluids are not available ("No"), the process can proceed to step 186. At step 186, the system can determine an optimum refill path or location to exit the prescribed travel route which minimizes the current amount of fluid, such as product, in the storage tank, and minimize distance between the machine 10 and the tender system 102, with at least some fluid remaining in the storage tank at the location. In this way, the machine 10 can continue to treat the field during a field operation as it traverses to the tender system 102 to refill, thereby optimizing field productivity. In another aspect, the system can further select an optimum tender system 102 from among multiple available tender systems 102 in the field.

Next, at step 188, the system can determine a refill amount of fluid for the machine 10. The refill amount can be calculated from the determined path to the location and the current and projected amounts of fluid. In one aspect, the current amount of fluid can be determined from a sensor configured to sense an amount of fluid in a tank. In another aspect, the current amount of fluid can be determined by monitoring application rate of the fluid and speed of the machine 10. Then, the system can use the wireless communications system 82 to communicate the refill amount to the wireless communications system 106 of the tender 104. In one aspect, the tender 104, in turn, can prepare the refill amount in advance, such as mixing exact amounts of chemical concentration and carrier fluid, so that the fluid is ready upon arrival of the machine 10 with the least amount of waste possible. Next, at step 190, the system can indicate an alert to user, such as via the HMI, when approaching the location, to assist in navigation to tender 104.

Finally, at decision step 192, the system can determine whether a refill of the desired fluids has been achieved, such as according to the process 150 of FIG. 4. If a refill has been achieved ("Yes"), the process can return to step 182 to repeat for the next refill necessary to complete the field operation. However, if a refill has not been achieved ("No"), the process can return to step 186 to recalculate the next optimum refill location.

Figure 6:
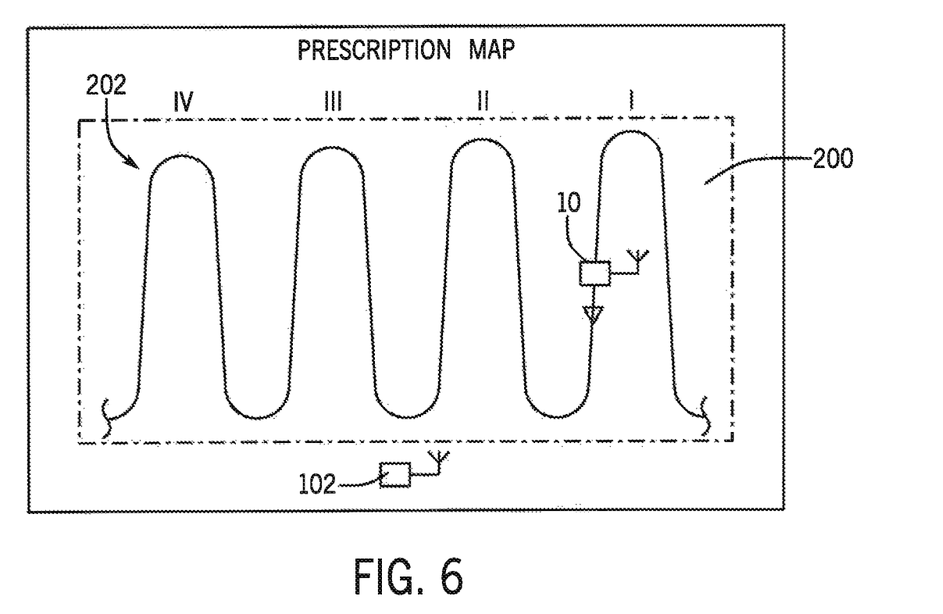
FIG. 6 is an exemplar prescription map illustrating a route for a sprayer relative to a tender according to the present invention.

By way of example, referring now to FIG. 6, a machine 10, in wireless communication with a tender system 102, can execute a field operation according to a prescription map 200. In conducting the field operation, the machine 10 can be guided in its progress by a GPS as it traverses from pass to pass along a serpentine shape travel route 202. At the moment of time illustrated in FIG. 6, the machine 10 has completed an outbound pass, relative to the tender system 102, in an area "I," and is traveling through an inbound pass in the area I. The control system 80 of the machine 10 is projecting an outbound pass in an area "II," followed by an inbound pass in the area II, followed by an outbound pass in an area "III," and so forth, necessary to complete the predetermined field operation. The control system 80 of the machine 10 is also monitoring current amounts of fluids in storage tanks of the machine 10, such as the current amount of product 36 in the product tank 34, as well as product application rate, speed of the machine, and the like, according to actual execution by the machine and projected execution according to the prescription map 200. Accordingly, the control system 80 can determine necessary or projected amounts of fluid to complete the field operation from the current position on the prescription map. The control system 80 is also aware of the location the tender system 102, which also includes a GPS, and which provides its GPS location to the machine 10. At the moment of time illustrated in FIG. 6, the tender system 102 has been set up at the inbound pass in the area II and the outbound pass in the area III.

Figure 7:
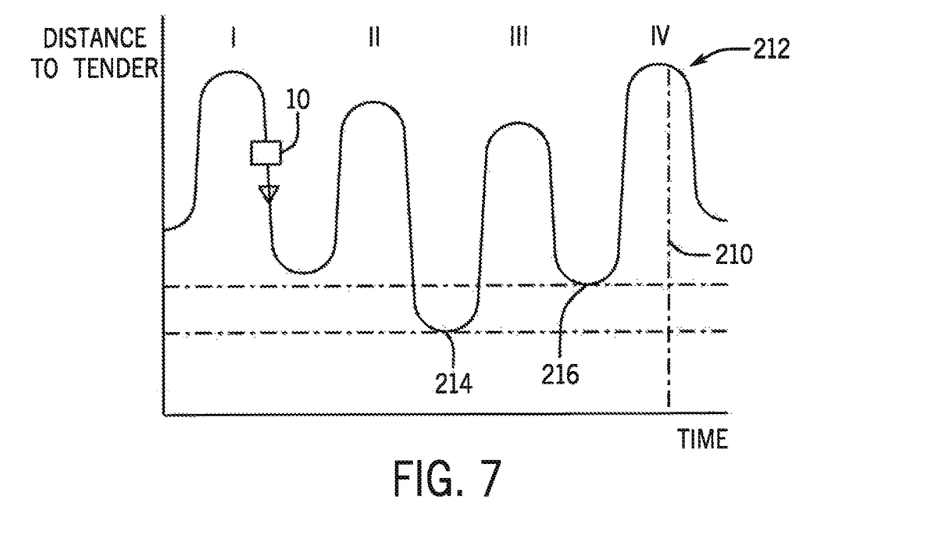
FIG. 7 is an exemplar graph for determining a refill path and time according to the prescription map of FIG. 6.

Referring now to FIG. 7, the control system 80 can execute to determine a time 210 in which the machine 10 will be completely depleted of a monitored fluid, such as product 36. The control system 80 can also execute to map a continuous distance 212 from the machine 10 to the tender system 102 through the prescription map. Having determined that the machine 10 will be completely depleted of a monitored fluid before completing the field operation, in this case during the inbound pass in the area "IV," the control system 80 can execute to determine an optimum refill path to the location which minimizes the current amount of fluid, such as product 36, in the storage tank, and minimize a distance between the machine 10 and the tender system 102, with at least some fluid remaining in the storage tank at the location. In addition, minimization of the current amount of fluid and minimization of the distance to the tender system 102 can be applied as weighted variables so that minimization of one can be prioritized over minimization of the other. In one aspect, minimization of the current amount of fluid can be prioritized over minimization of the distance to the tender system 102, such that a first location 214 is determined for exiting or deviating from the prescription map. In another aspect, minimization of the distance to the tender system 102 can be prioritized over minimization of the current amount of fluid, such that a second location 216 is determined for exiting the prescription map. With either determination, distance to the tender system 102 is minimized, with fluid remaining the machine 10, such that the machine 10 does not travel the inbound pass in the area IV, beyond the time 210 in which the machine 10 will be completely depleted of the fluid, without having stopped at the tender system 102 to refill the fluid.

Having determined the location for the optimum refill path or location to exit the prescribed travel route, the control system 80 can determine a refill amount of fluid for the machine 10 using the determined path based on the current and projected amounts of fluid. Then, the control system 80 can use the wireless communications system 82 to communicate the refill amount to the wireless communications system 106 of the tender 104. Also, the control system 80 can indicate an alert to user, such as when approaching the tender system 102 at the inbound pass in the area II.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An automated loading system for an agricultural machine, comprising:
    an interlock system in fluid communication to a storage tank, the interlock system comprising:
        a channel for loading fluid into the storage tank;
        an intake coupler connected to the channel;
        an electronically controlled valve for opening and closing the channel; and
        a supply coupler coupled with an articulating arm and fluidly coupled with a container of a tender;
    a sensing system comprising:
        a first sensor configured to sense a position of the agricultural machine relative to a tender for loading the storage tank; and
        a second sensor configured to sense a position of the intake coupler relative to a supply coupler of the tender; and
    a control system in communication with the interlock system and the sensing system, the control system executing a program stored in a non-transient medium operable to:
        receive a command from a user to initiate loading of the storage tank;
        after receiving the command, use the first sensor to determine whether a position of the agricultural machine relative to a tender is within a threshold;
        after determining the position of the agricultural machine relative to the tender to be within the threshold, extend the articulating arm to couple the intake coupler with the supply coupler;
        after determining the intake coupler is connected to the supply coupler, use the second sensor to determine whether the intake coupler is connected to the supply coupler; and
        after determining the intake coupler to be connected to the supply coupler, control the electronically controlled valve to open the channel for loading fluid into the storage tank.

2. The system of claim 1, wherein the storage tank is configured to receive a fluid, and wherein the fluid is an agricultural product; a or rinse water.

3. The system of claim 1, wherein the interlock system further comprises an electronically controlled motor for actuating the intake coupler relative to the supply coupler.

4. The system of claim 1, wherein the intake coupler comprises a twist-lock connector having a rotary cam configured to provide a fluid-tight connection with the supply coupler.

5. The system of claim 1, wherein the first sensor comprises a Global Positioning System (GPS).

6. The system of claim 1, wherein the first sensor comprises an electromagnetic or ultrasonic proximity sensor.

7. The system of claim 1, wherein the first sensor comprises a light curtain.

8. The system of claim 1, wherein the second sensor comprises a pressure sensor.

9. The system of claim 1, wherein the second sensor comprises a magnetic proximity sensor.

10. The system of claim 1, further comprising a Human Machine Interface (HMI) arranged in a cab of the agricultural machine for receiving the command.

11. The system of claim 1, wherein the control system is further operable to establish a wireless communications link between the agricultural machine and the tender.

12. The system of claim 1, wherein the control system is further operable to, after controlling the electronically controlled valve to open the channel, control an electronically controlled valve associated with the supply coupler to open a channel associated with the supply coupler.

13. The system of claim 1, wherein the control system is further operable to control the electronically controlled valve to close the channel for loading fluid into the storage tank after receiving a predetermined amount of fluid.

14. The system of claim 1, further comprising a light or sound indicating at least one of: the position of the agricultural machine relative to a tender to be within a threshold; and the intake coupler being connected to the supply coupler.

15. The system of claim 1, wherein the agricultural machine is a self-propelled sprayer.

16. An automated loading system for an agricultural machine, comprising:
- an interlock system in fluid communication to a storage tank, the interlock system comprising:
  - a channel for loading fluid into the storage tank;
  - an intake coupler connected to the channel; and
  - an electronically controlled valve for opening and closing the channel;
- a sensing system comprising:
  - a light curtain configured to sense a position of the agricultural machine relative to a tender for loading the storage tank; and
  - a second sensor configured to sense a position of the intake coupler relative to a supply coupler of the tender; and
- a control system in communication with the interlock system and the sensing system, the control system executing a program stored in a non-transient medium operable to:
  - receive a command from a user to initiate loading of the storage tank;
  - after receiving the command, use the a light curtain to determine whether a position of the agricultural machine relative to a tender is within a threshold;
  - after determining the position of the agricultural machine relative to a tender to be within the threshold, use the second sensor to determine whether the intake coupler is connected to the supply coupler; and
  - after determining the intake coupler to be connected to the supply coupler, control the electronically controlled valve to open the channel for loading fluid into the storage tank.

17. An automated loading system for an agricultural machine, comprising:
- an interlock system in fluid communication to a storage tank, the interlock system comprising:
  - a channel for loading fluid into the storage tank;
  - an intake coupler connected to the channel;
  - an electronically controlled valve for opening and closing the channel;
  - a supply coupler coupled with an articulating arm and fluidly coupled with a container of a tender;
- a sensing system comprising:
  - a first sensor configured to sense a position of the agricultural machine relative to a tender for loading the storage tank; and
- a control system in communication with the interlock system and the sensing system, the control system executing a program stored in a non-transient medium operable to:
  - receive a command from a user to initiate loading of the storage tank;
  - after receiving the command, use the first sensor to determine whether a position of the agricultural machine relative to a tender is stationary and within a threshold;
  - after determining the position of the agricultural machine relative to the tender to be stationary and within the threshold, extend the articulating arm to couple the intake coupler with the supply coupler.

18. The automated loading system for an agricultural machine of claim 17, further comprising:
- a second sensor configured to sense a position of the intake coupler relative to a supply coupler of the tender, and wherein the control system is further configured to:
  - use the second sensor to determine whether the intake coupler is connected to the supply coupler after determining the intake coupler is connected to the supply coupler; and
  - control the electronically controlled valve to open the channel for loading fluid into the storage tank after determining the intake coupler to be connected to the supply coupler.

* * * * *